United States Patent
Tägtström et al.

(12) 
(10) Patent No.: US 6,238,147 B1
(45) Date of Patent: May 29, 2001

(54) CUTTING INSERT FOR GROOVING

(75) Inventors: Pär Tägtström; Jörgen Wiman, both of Sandviken (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/316,965

(22) Filed: May 24, 1999

(30) Foreign Application Priority Data

May 22, 1998 (SE) .................................................. 9801800

(51) Int. Cl.⁷ .................................................. B23B 27/04
(52) U.S. Cl. ........................ 407/117; 407/114; 407/116
(58) Field of Search .................................. 407/113, 114, 407/115, 116, 117

(56) References Cited

U.S. PATENT DOCUMENTS

| | | |
|---|---|---|
| 4,778,311 | 10/1988 | Niemi . |
| 4,992,008 | 2/1991 | Pano . |
| 5,040,930 * | 8/1991 | Zinner ...................... 407/117 X |
| 5,135,336 | 8/1992 | Noguchi et al. . |
| 5,423,639 | 6/1995 | Wiman . |
| 5,634,745 * | 6/1997 | Wiman et al. ................ 407/114 X |
| 5,827,017 * | 10/1998 | Tagstrom et al. ................ 407/116 |

FOREIGN PATENT DOCUMENTS

| | | | |
|---|---|---|---|
| 000409143 * | 1/1991 | (EP) | ...................... 407/113 |
| 1521529 * | 11/1989 | (SU) | ...................... 407/113 |

* cited by examiner

*Primary Examiner*—Henry Tsai
(74) *Attorney, Agent, or Firm*—Burns, Doane, Swecker & Mathis, L.L.P.

(57) ABSTRACT

A cutting insert for grooving operations includes a shank portion and a forward cutting head. The shank portion includes an upper surface, a bottom surface and side surfaces, wherein a line of intersection between the upper side and a forward clearance face forms a main cutting edge. Between the main cutting edge and a secondary cutting edge there is provided a corner cutting edge. The corner cutting edge comprises a primary curved edge with a first radius extending from the main cutting edge, and a secondary curved edge with a second radius, larger than the first radius, that extends from the primary edge to a side edge and oriented perpendicular to the main cutting edge. The cutting insert also comprises an upper side confined by two longitudinal ridges and an elongated chip forming recess therebetween.

12 Claims, 2 Drawing Sheets

US 6,238,147 B1

CUTTING INSERT FOR GROOVING

BACKGROUND OF THE INVENTION

The present invention relates to a cutting insert for grooving operations. In particular, the present cutting insert according to the invention is suitable for radial grooving, although it also can be used for various axial grooving and parting off operations, as well as for axial and radial longitudinal turning operations.

During such machining, chip breaking and chip formation are often of decisive importance for undisturbed production. Modern high productive machines put very high claims on good chip transport. Long uncontrollable chips can easily cause machine interruptions and cessation. Chip control must therefore be given high priority and governs to a high degree the tool design.

Cutting inserts intended for grooving operations and parting off are usually clamped in a holder, which is blade shaped in order to be useful in the slot produced. The expression "holder of blade type" is also intended to comprise slot mills. Such cutting inserts are for example known from U.S. Pat. No. 4,778,311, U.S. Pat. No. 4,992,008, U.S. Pat. No. 5,135,336 and U.S. Pat. No. 5,423,639. At the same time, it is necessary to be able to obtain an improved surface finish of the surfaces in the slots produced. A first purpose is to produce a cutting insert, which is well suited to give improved finish of the surfaces in the slot produced in a work piece.

It is another purpose of the present invention to produce a cutting insert, which is well suited for repeated radial grooving.

It is a third purpose to produce a cutting insert, which gives the possibility to achieve good surface roughness in combination with high feed and good chip control.

It is a fourth purpose with the present invention to produce a cutting insert which also can be used for longitudinal turning in particular on the bottom surface of a widened slot.

SUMMARY OF THE INVENTION

These and other purposes have been achieved by a metalcutting insert comprising a shank portion and a cutting head. The shank portion defines a longitudinal axis, and the cutting head is located at a longitudinal end of the shank portion. The cutting head includes an upper surface, a bottom surface, two side clearance surfaces each extending between the upper and bottom surfaces, and a front clearance surface disposed between the side clearance surfaces and extending between the upper and bottom surfaces. An intersection between the upper surface and the front clearance surface forms a main cutting edge extending generally perpendicular to the longitudinal axis. The intersection between the upper surface and each side clearance surface defines a side edge having a clearance angle. The upper surface includes a pair of ridges extending generally longitudinally on opposite sides of the longitudinal axis and spaced apart to define a chip-forming recess between one another. The cutting insert further includes corner cutting edges extending between respective ones of the side edges and the main cutting edge. Each corner cutting edge includes a primary curved edge extending from the main cutting edge, and a curved wiper edge extending from the primary curved edge to the side edge. The primary curved edge has a smaller radius of curvature than the curved wiper edge.

BRIEF DESCRIPTION OF THE DRAWING

The objects and advantages of the invention will become apparent from the following detailed description of preferred embodiments thereof in connection with the accompanying drawing, in which like numerals designate like elements, and in which.

DETAILED DESCRIPTION OF PREFERRED EMBODIMENTS OF THE INVENTION

Figure 1:
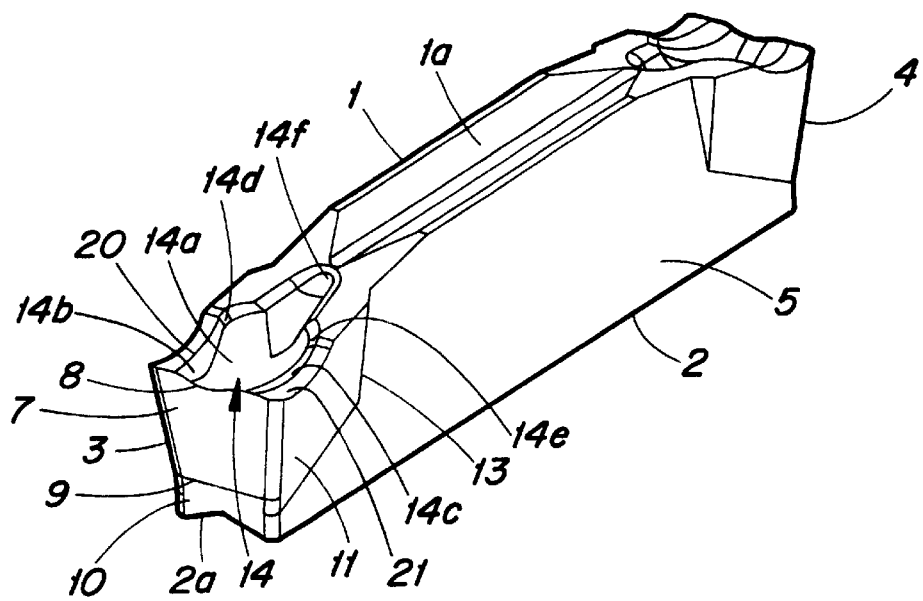
FIG. 1 shows a cutting insert according to the invention in a perspective view as seen obliquely from above.
Figure 2A:
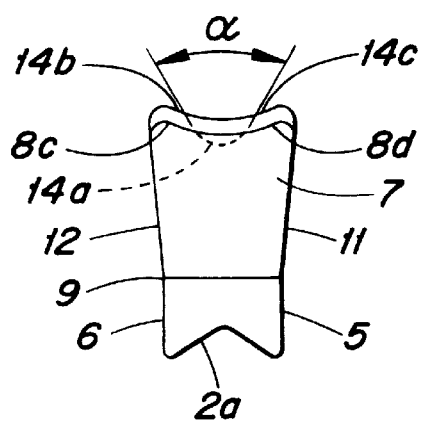
FIG. 2a shows the same cutting insert as in FIG. 1 as seen straightly from its forward end.
Figure 2B:
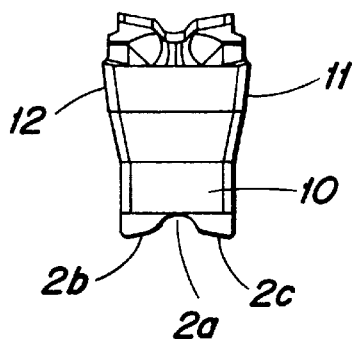
FIG. 2b shows an alternatively embodiment of a cutting insert.
Figure 3:
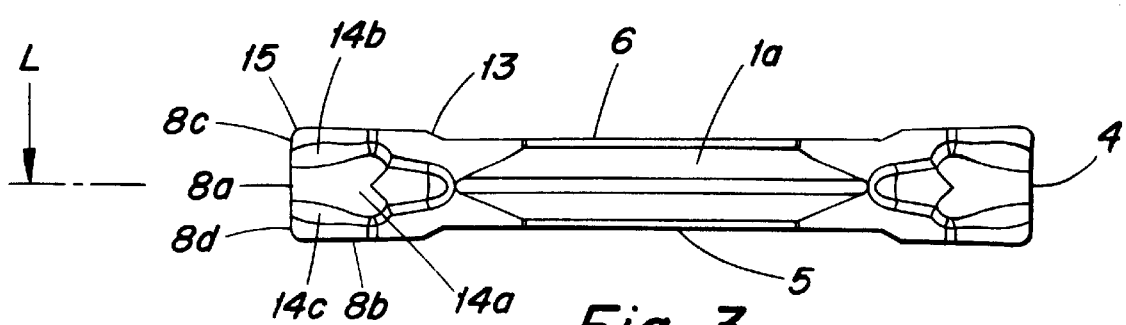
FIG. 3 shows the same cutting insert as in FIG. 1, straight from above.

FIGS. 1–3 shows a cutting insert for grooving according to the invention including a body of parallelepipedic shape with an upper surface 1, a bottom surface 2, a forward end surface 3, a rear end surface 4, as well as opposite plane parallel side faces 5, 6. The cutting insert is generally made of coated or sometimes non-coated cemented carbide; the upper surface 1 and the bottom surface 2 are each shaped with a longitudinally concave V-shaped keyway ia and 2a. Alternatively the cutting insert can be as the embodiment according in FIG. 2b, where the bottom support surfaces 2b, 2c on respective sides of the central concave groove 2a, have an inclination and are intended to support against corresponding inclined support surfaces in a blade holder in the way that is described in Swedish Patent Application No. 9703434-2, the contents of which are hereby incorporated by reference. The central part of the cutting insert is a shank portion defining a longitudinal axis. A cutting head is formed at each longitudinal end of the elongated shank portion. Each cutting head has an end surface composed of a front clearance surface 7 that by the intersection with the upper surface 1 forms a transverse cutting edge 8a, which via a corner 15, 16 extends to side edges 8b. The clearance surface 7 intersects, via a transverse break line 9, a lower front surface 10, which extends essentially perpendicularly toward the bottom surface 2. Each of the cutting heads has two side clearance surfaces 11, 12, situated laterally outwardly with respect to the longitudinal axis, and which via a break line 13 merge into respective ones of the side surfaces 5.

The upper surface disposed adjacent the cutting edge 8 is a chip surface that extends inwards from the cutting edge 8 and is formed with a chip former 14 in the shape of a recess that intersects the cutting edge and passes between two separate ridges 20 and 21. In this way the cutting edge 8 becomes concave in relation to the upper surface 1 and is formed with a chip angle which varies along the cutting edge of the insert such that the chip angle is more positive at the central portion 8a than at the end portions 8c and 8d of the main cutting edge. That is, the chip angle formed between the clearance surface 7 and a central recess 14a of the chip former, is smaller than chip angles formed between the clearance surface 7 and the ridges 20, 21.

The inner side faces 14b and 14c, which define the sides of the chip former 14, form an angle α therebetween and straddle the central, axially extending recess 14a of the chip former, which recess extends axially along the upper surface 1. The depth of the recess 14a first increases from the cutting edge and, at some distance from said cutting edge 8, begins to diminish. The angle α extends uniformly in the axial direction, in a direction away from the cutting edge 8. Simultaneously the design is such that the obliquely downwards inclined inner side faces 14b and 14c of the ridges 20 and 21 have a width that diminishes uniformly from a broad area near the cutting edge to a minimum area at the level of raised portions 14d, 14e which lie above the cutting edge 8.

The width of the inner side faces 14b, 14c remains essentially constant in a rearward direction after passing the portions 14d and 14e. The side faces 14b and 14c have portions which converge rearwardly into a concave shaped end portion 14f.

Figure 4:
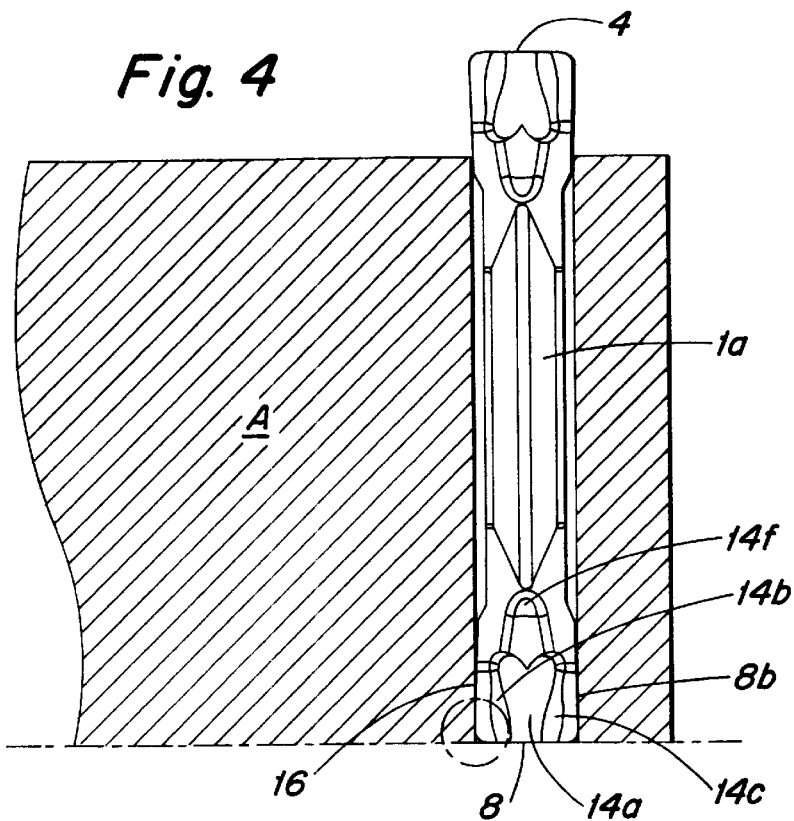
FIG. 4 shows the same cutting insert as in FIG. 1, as seen from above and in engagement with a work piece.
Figure 5:
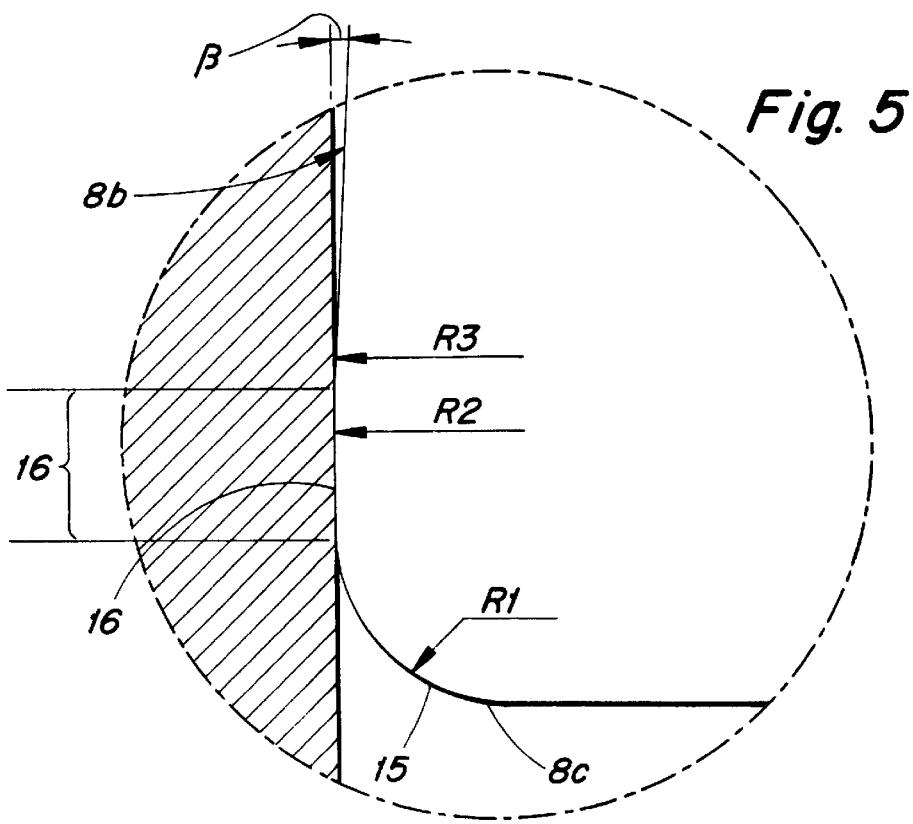
FIG. 5 shows an enlarged detail of a cutting corner of the cutting insert that is shown in FIG. 4.

In FIGS. 4–5 there is shown a cutting insert according to FIGS. 1–3 in engagement with a work piece A.

Each corner portion on the upper side 1 of the insert includes a varying convex radius of curvature. That is, each corner includes a primary curved edge 15, which extends to the adjacent end portion 8c of the main cutting edge 8, as well as a secondary cutting edge 16 or "wiper edge." In order to reinforce the cutting edge, this wiper edge 16 could possibly be equipped with a primary chamfer. As shown in FIG. 5 the wiper edge 16 is formed with a radius R2 that is substantially bigger than the radius R1 of primary edge 15, whereby the edge 16 appears almost straight in FIG. 5. Wiper edge 16 extends rearwardly to the side edge 8b, the radius R3 of which is substantially less than R2. The curved edge 8b extends rearwardly with a side clearance angle of about 1–5° preferably 2–3°.

Radius R2 of the wiper edge 16 is chosen such that the edge 16 acts like a round insert. The wiper edge can consequently be considered as being analogous to a segment of an imaginary circular round insert. The substantial advantage of the present insert compared with a round insert is that the primary edge 15 and the wiper edge 16 generate considerably narrower and thicker chips than compared with a round insert under the same operation parameters, which gives good chip control. Since radius R2 is chosen considerably larger than R1, a favorable "wiper" effect is obtained which gives considerably improved surface finish. As a further consequence, a subsequent finishing operation can be eliminated.

In order to attain optimal chip control, the different radii of the various curved edges should be chosen within the following intervals:

R1: 0.1–12 mm, preferably 0.2–2.0

R2: 2.5–20 mm, preferably 2.5–5.0

R3: 0.1–2 mm, preferably 0.2–0.5

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A metal cutting insert comprising:

a shank portion and a cutting head, the shank portion being elongated in a direction defining a longitudinal axis of the shank, the cutting head located at a longitudinal end of the shank portion, the cutting head including an upper surface, a bottom surface, two side clearance surfaces each extending between the upper and bottom surfaces, and a front clearance surface disposed between the side clearance surfaces and extending between the upper and bottom surfaces, an intersection between the upper surface and the front clearance surface forming a main cutting edge extending generally perpendicular to the longitudinal axis, the main cutting edge being straight as viewed in a direction perpendicular to the upper surface, the intersection between the upper surface and each side clearance surface defining a side edge having a clearance angle;

the upper surface including a pair of ridges extending generally longitudinally on opposite sides of the longitudinal axis and spaced apart to define a chip-forming recess between one another;

the cutting insert further including corner cutting edges disposed at respective ends of the main cutting edge, the corner cutting edges extending between respective ones of the side edges and the main cutting edge, each corner cutting edge including a primary curved edge of constant radius extending from the main cutting edge, and a curved wiper edge of constant radius extending from the primary curved edge to the side edge, the primary curved edge having a smaller radius of curvature than the curved wiper edge.

2. The cutting insert according to claim 1 wherein the side edge has a radius of curvature smaller than the radius of curvature of the wiper edge.

3. The cutting insert according to claim 2 wherein the side edge forms a clearance angle in the range of 1 to 5°.

4. The cutting insert according to claim 3 wherein the radius of curvature of the primary curved edge is in the range of 0.1 to 12.0 mm.

5. The cutting insert according to claim 4 wherein the radius of curvature of the wiper edge is in the range of 2.5 to 20.0 mm.

6. The cutting insert according to claim 5 wherein a radius of curvature of the side edge is in the range of 0.1 to 2.0 mm.

7. The cutting insert according to claim 1 wherein the radius of curvature of the primary curved edge is in the range of 0.1 to 12.0 mm.

8. The cutting insert according to claim 7 wherein the radius of curvature of the primary curved edge is in the range of 0.2 to 2.0 mm.

9. The cutting insert according to claim 1 wherein the radius of curvature of the wiper edge is in the range of 2.5 to 20.0 mm.

10. The cutting insert according to claim 9 wherein the radius of curvature of the wiper edge is in the range of 2.5 to 5.0 mm.

11. The cutting insert according to claim 2 wherein the radius of curvature of the side cutting edge is in the range of 0.1 to 2.0 mm.

12. The cutting insert according to claim 11 wherein the radius of curvature of the side edge is in the range of 0.2 to 0.5 mm.

\* \* \* \* \*